United States Patent
Lahti

(10) Patent No.: US 7,516,489 B2
(45) Date of Patent: Apr. 7, 2009

(54) ANTI-VIRUS PROTECTION AT A NETWORK GATEWAY

(75) Inventor: Pasi Lahti, Helsinki (FI)

(73) Assignee: F-Secure Oyj, Helsinki (FI)

( * ) Notice: Subject to any disclaimer, the term of this patent is extended or adjusted under 35 U.S.C. 154(b) by 409 days.

(21) Appl. No.: 10/501,336

(22) PCT Filed: Jan. 23, 2003

(86) PCT No.: PCT/EP03/00752

§ 371 (c)(1),
(2), (4) Date: Jan. 27, 2005

(87) PCT Pub. No.: WO03/063431

PCT Pub. Date: Jul. 31, 2003

(65) Prior Publication Data

US 2005/0120229 A1 Jun. 2, 2005

(30) Foreign Application Priority Data

Jan. 25, 2002 (GB) ................. 0201648.3

(51) Int. Cl.
G06F 11/30 (2006.01)
G06F 15/16 (2006.01)

(52) U.S. Cl. ................. 726/24; 709/206; 709/207; 713/188

(58) Field of Classification Search ........... 726/24
See application file for complete search history.

(56) References Cited

U.S. PATENT DOCUMENTS

| 5,832,208 | A  | * | 11/1998 | Chen et al. ............. 726/24 |
| 5,889,943 | A  | * | 3/1999 | Ji et al. ............. 726/22 |
| 6,035,423 | A  | * | 3/2000 | Hodges et al. ............. 714/38 |
| 6,269,456 | B1 | * | 7/2001 | Hodges et al. ............. 714/38 |
| 6,757,830 | B1 | * | 6/2004 | Tarbotton et al. ............. 713/188 |
| 6,901,519 | B1 | * | 5/2005 | Stewart et al. ............. 726/24 |
| 6,993,660 | B1 | * | 1/2006 | Libenzi et al. ............. 713/188 |
| 7,080,000 | B1 | * | 7/2006 | Cambridge ............. 703/21 |
| 7,117,533 | B1 | * | 10/2006 | Libenzi ............. 726/24 |
| 2002/0147780 | A1 | * | 10/2002 | Liu et al. ............. 709/206 |
| 2003/0088680 | A1 | * | 5/2003 | Nachenberg et al. ............. 709/229 |
| 2004/0054498 | A1 | * | 3/2004 | Shipp ............. 702/182 |

* cited by examiner

Primary Examiner—Christian LaForgia
(74) Attorney, Agent, or Firm—Arent Fox LLP

(57) ABSTRACT

A method of preventing the infection of a computer network 1 by a computer virus, where that virus can be spread by e-mail traffic. The method comprises installing at an e-mail gateway 7 of the network an anti-virus application 12, which application scans at least incoming e-mail traffic for known viruses. In the event that a new virus is detected by the provider of the anti-virus application 12, a notification of this event is sent from the provider to the anti-virus-application 12. At the anti-virus application 12, receipt of said notification results in the diversion of incoming e-mails or their attachments to a buffer 13 for safe storage.

7 Claims, 2 Drawing Sheets

ANTI-VIRUS PROTECTION AT A NETWORK GATEWAY

CROSS-REFERENCE TO RELATED APPLICATION

This application is a National Stage entry of International Application Number PCT/EP03/00752, filed Jan. 23, 2003. The disclosure of the prior application is hereby incorporated herein in its entirety by reference.

FIELD OF THE INVENTION

The present invention relates to the provision of anti-virus protection at a network gateway.

BACKGROUND TO THE INVENTION

Much damage has recently been caused by the creation and spread of software viruses. As well as the loss and corruption of data, viruses have been responsible for the shutting down of individual computers and even entire networks, leading to a great loss in productivity. The recent "success" of software viruses such as the "Love Letter" virus is due to the proliferation of e-mail as a means of communication between computer users coupled with a lack of knowledge of the potential problems amongst computer users (e.g. users will open e-mail attachments without regard to their origins).

In order to mitigate the potential damage caused by viruses, responsible computer users and network operators make use of anti-virus applications such as the F-Secure™ Anti-Virus product. For network operators, an optimal solution is to install an anti-virus application on individual client computers to scan data created and installed locally (e.g. from a floppy or CD-ROM drive, and an anti-virus application at the e-mail gateway to the network to scan e-mails and their attachments prior to their entry to (and possibly exit from) the network. Anti-virus applications may also be located at other locations. In the case of an anti-virus application located at an e-mail gateway, if a virus is detected in an e-mail and/or e-mail attachment, the e-mail and/or attachment may be disinfected if possible and forwarded to the recipient within the network or, if disinfection is not possible, the e-mail and/or e-mail attachment may be either quarantined or deleted and an appropriate notification sent to the recipient and network administrator.

Anti-virus applications typically make use of a database of virus signatures or fingerprints. Data is scanned by the application for the presence of these signatures. The providers of anti-virus applications are constantly seeking to identify new viruses and to create signatures for these. Following the discovery of a new virus and the generation of a signature for that virus, the damage caused by that virus can be reduced by getting the signature into the field as quickly as possible. The signatures are distributed to anti-virus applications in the field using a number of techniques. Originally, signature updates were provided by posting out floppy disks or CD-ROM disks. However, the most common techniques used today employ Internet based protocols.

STATEMENT OF THE INVENTION

Despite the best efforts of anti-virus product providers, it can sometimes take several hours or even a few days to generate a signature for a new virus following the discovery of that virus. This presents a window of opportunity for the virus to spread. In order to close this window, some administrators of vulnerable networks have in the past "manually" shut down their e-mail gateways following the issuing of a virus warning, until such time as a virus signature has been provided to them by their anti-virus product provider. It will be appreciated that this action often comes too late to avoid the infection of a network and the resulting damage.

According to a first aspect of the present invention there is provided a method of preventing the infection of a computer network by a computer virus, where that virus can be spread by e-mail traffic, the method comprising:

installing at an e-mail gateway of the network an anti-virus application, which application scans at least incoming e-mail traffic for known viruses;

in the event that a new virus is detected by the provider of the anti-virus application, sending a notification of this event from the provider to the anti-virus-application; and at the anti-virus application, responding to said notification by failing to deliver incoming e-mails or their attachments to their recipients within the network and causing these e-mails or attachments to be re-directed to a buffer for safe storage.

Embodiments of the present invention provide a mechanism for rapidly "sealing" networks against viruses following the discovery of a new virus by an anti-virus product provider. This minimises exposure of networks to infection prior to the generation and distribution of a signature for the virus.

There are a number of means by which anti-virus applications may be notified of the discovery of a new virus. Notifications may be pushed to the applications using IP (Internet Protocol) based protocols, e.g. HTTP or SNMP protocol, or using an Internet mechanism such as Backweb™, or may be pulled by the applications from a central server of the provider again using HTTP, e.g. the application may make a regular connection to a web site operated by the provider and at which virus alerts are made available. At least in the case of push mechanisms, notifications must contain some means for authenticating the origin of the message. This may be achieved using public/private key pairs. Some mechanism should also be available for enabling the provider to confirm that a notification has been received by a client.

Following the generation of a signature for the virus by the anti-virus application provider, and the provision of that signature to the application, the application may be arranged to scan the previously buffered e-mails or attachments for the virus. E-mails or attachments which are virus free are then delivered to their recipients. E-mails or attachments containing the virus, or suspected to contain the virus, are disinfected, quarantined or deleted, or are delivered to their recipients without attachments. Newly received e-mails may be scanned as normal using the updated signature database.

The application may check each signature update received from the provider to see if it contains a signature for said new virus. If so, then the application may proceed with said scan of the buffered e-mails or attachments and will scan newly received e-mails as normal. Alternatively, a separate notification may be sent from the provider to the application to notify the application that the latest signature update contains a signature for said new virus, and that the temporary e-mail diversion procedure can be terminated following installation of the latest update.

In certain embodiments, receipt of said first mentioned notification by the application may cause subsequently received e-mails to be delivered to their recipients minus any attachments. A copy of these e-mails with attachments are stored in the buffer.

According to a second aspect of the present invention there is provided an anti-virus application for installation on a network server on which is also installed an e-mail gateway, the application being arranged to interact with the e-mail gateway to scan incoming e-mails and/or e-mail attachments for known viruses, the application having means for receiving a notification from the provider of the application which notification causes the application to prevent delivery of e-mails or e-mail attachments received at the gateway and to divert these e-mails or attachments to a buffer for safe storage, and means for subsequently receiving a second notification from the provider which notification causes the application to cease preventing delivery of newly received e-mails or attachments.

According to a third aspect of the present invention there is provided a computer software storage medium having stored thereon an anti-virus application for causing a computer operating as an e-mail gateway to scan incoming e-mails and/or e-mail attachments for known viruses, the application being arranged to receive a notification from the provider of the application which notification causes the application to prevent delivery of e-mails or e-mail attachments received at the gateway and to divert these e-mails or attachments to a buffer for safe storage, and to subsequently receive a second notification from the provider which notification causes the application to cease preventing delivery of newly received e-mails or attachments.

According to a fourth aspect of the present invention there is provided a method of preventing the infection of a computer network by a computer virus, where that virus can be spread by e-mail traffic, the method comprising:

installing at an e-mail gateway of the network an anti-virus application, which application scans at least incoming e-mail traffic for known viruses using a database of virus signatures;

in the event that a new virus is detected by the provider of the anti-virus application, calculating a checksum for the file carrying the virus or a relevant part of that file, and sending a notification containing the checksum from the provider to the anti-virus-application; and at the anti-virus application, using the checksum to screen e-mails and/or their attachments for the virus until such time as a signature for the virus is received by the e-mail gateway from the application provider.

DETAILED DESCRIPTION OF A PREFERRED EMBODIMENT

Figure 1:
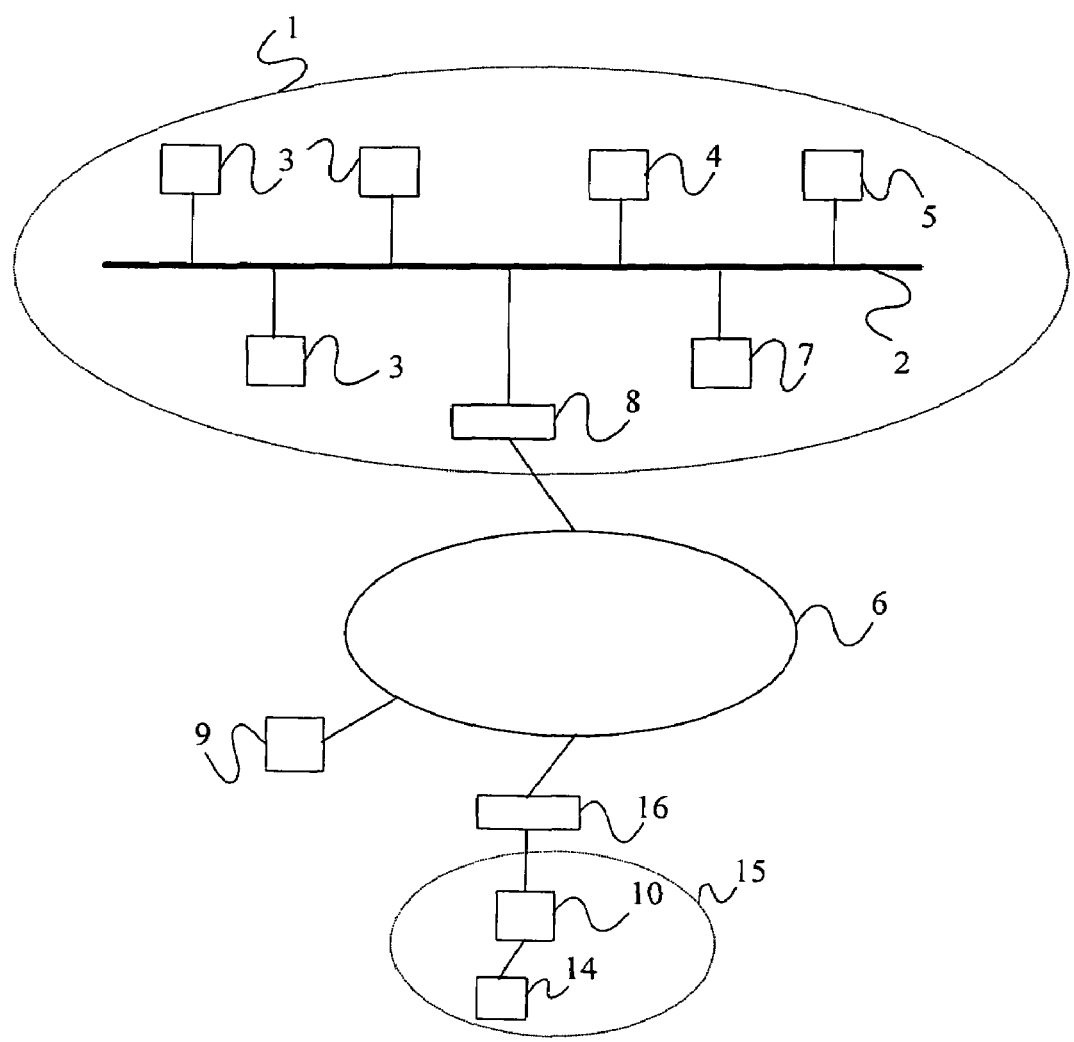
FIG. 1 illustrates schematically a corporate LAN coupled to the Internet.

There is illustrated in FIG. 1 a corporate Local Area Network (LAN) 1 comprising a network backbone 2, a multiplicity of client work stations 3 and a plurality of servers including a network server 4 providing file storage capacity, an Internet server 5 for enabling the client workstations 3 to access the Internet 6, and an e-mail server 7. Both the Internet server 5 and the e-mail server 7 are coupled to the Internet 6 via a router 8.

The e-mail server 7 consists of a workstation running an e-mail server application such as Microsoft Exchange Server™, and having an "always connected" Internet connection. In use, the e-mail server application connects to a service provider 9 via the Internet 6 (using the SMTP protocol) to collect e-mails from and to deliver e-mails to the service provider 9. An anti-virus application, or anti-virus "gateway", is installed on the e-mail server 7. The application makes use of a database of signatures corresponding to known viruses. The database is updated using for example Backweb™ technology which causes updates to be pushed to the application from a central server 10, coupled to the Internet 6 via a router 16 and maintained by the application provider 15 (the application provider maintains in the server 10 a record of registered users to whom updates should be sent, together with their respective IP addresses or domain names). The anti-virus application incorporates web server functionality, having port TCP/IP 80 permanently open to allow HTTP connections to be established to the application by the central server 10.

Figure 2:
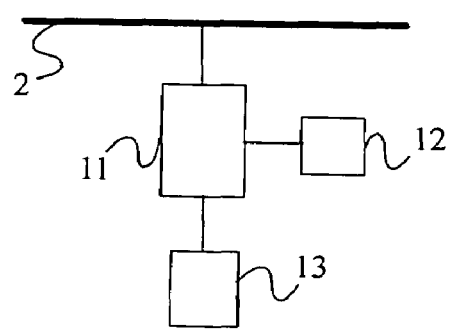
FIG. 2 illustrates schematically an e-mail gateway of the corporate LAN of FIG. 1.

The software architecture of the e-mail server 7 is illustrated schematically in FIG. 2 where the e-mail server application and the anti-virus application are identified by reference numbers 11 and 12 respectively. Also shown in FIG. 2 is a memory buffer 13 which may be provided by a portion of the hard disk space of the workstation on which the e-mail server is installed.

In normal use, when an e-mail is received by the e-mail server 7 from the service provider 9, delivery of the e-mail to the recipient is delayed and the e-mail scanned for viruses using the current virus signature database available to the anti-virus application 12. Typically, this might involve first determining whether or not the e-mail contains an attachment and, if so, scanning the attachment for viruses. In the event that no viruses are found, the e-mails and any attachments are delivered to the recipient client workstations 3. If a virus is found or is suspected to be present, the e-mail and its attachment is placed in a buffer memory. An attempt may be made to disinfect the e-mail. If the attempt is successful the mail and its attachment may be delivered to the recipient workstation. If it is unsuccessful, the mail and its attachment may be deleted, and a notification sent to the network administrator. Alternatively, the mail may be sent to the recipient with the attachment deleted.

As has been set out in the Background to the Invention section, there may be a significant delay between the discovery of a new virus and the generation and distribution of a signature for that virus. In order to minimise this window of opportunity during which e-mails can spread, a remote control feature is introduced into the anti-virus application 12. This allows the application provider to remotely control the e-mail server 7 to seal the server against infected e-mail traffic. The application 12 contains a mechanism which, when triggered remotely, instructs the e-mail server application 11 to divert incoming e-mails into a buffer 13 (e-mail servers typically already include an appropriate redirection mechanism, e.g. SMTP proxy). The e-mails are stored securely in this buffer until such time as a signature for the new virus is available and installed in the virus signature database of the application 12.

When a new virus is detected by an operator of the application provider and is deemed by that operator to be a high risk virus, the operator uses a web browser on his terminal 14 to establish an HTTP connection with each anti-virus application registered with the provider (in practice an instruction sent from the web browser to a filter at the server 10 results in a multi-cast operation being carried out by the server to establish the necessary multiple HTTP connections to port 80 of the web servers incorporated into the anti-virus applications, using the registered IP addresses or domain names). Once the HTTP connections are established, appropriate notifications are transmitted to the anti-virus applications. An ID code for the new virus will be included in the notifications. It will be appreciated that a firewall incorporated into the web servers can be used to authenticate and authorise the HTTP connections, and to prevent unauthorised access to the anti-virus applications.

When the anti-virus application 11 next receives a virus signature update (this may be pushed to the application from the application provider's server 10 or pulled by the application from that server 10), the application checks whether or not the update includes a signature for the new virus (which triggered the e-mail diversion mechanism) using the stored ID code for that virus. If the update does not contain the appropriate signature, the diversion mechanism is maintained. If on the other hand the update does include the appropriate signature, following the updating of the signature database, the application 11 scans the e-mails (and their attachments) using the updated database. E-mails certified-as being virus free are released for delivery to their recipients within the LAN 1. E-mails which contain a virus (or which are suspected of containing a virus) are maintained in the buffer 13 or deleted, or held in quarantine by the anti-virus application. The e-mail server application 11 is then instructed to terminate the diversion mechanism and to resume normal delivery of the e-mails within the LAN (subject of course to the normal virus scanning procedure).

Figure 3:
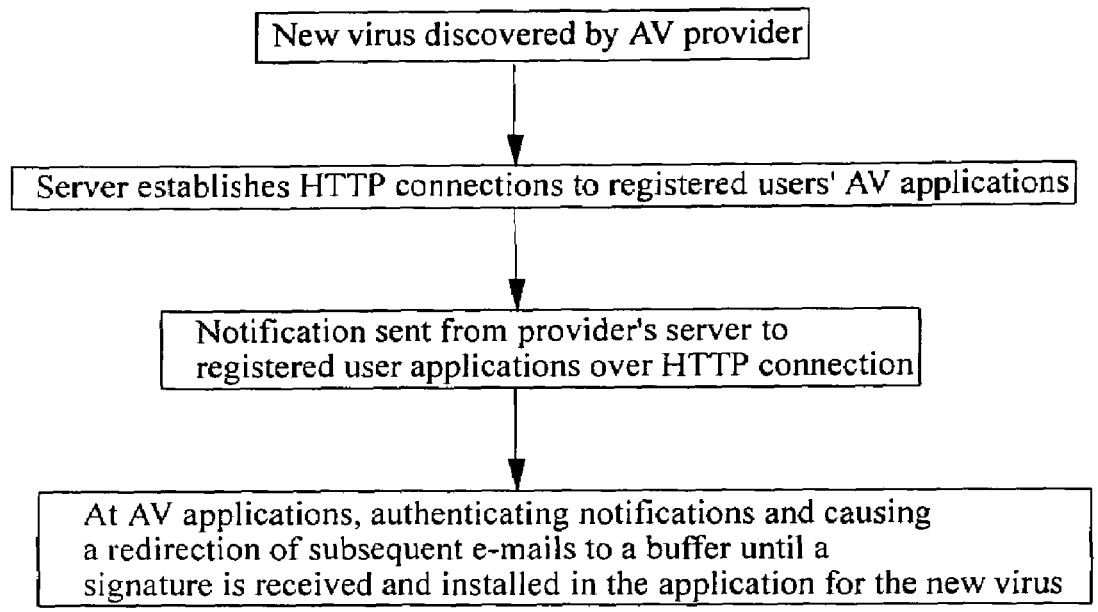
FIG. 3 is a flow diagram illustrating a mechanism implemented at the e-mail gateway of FIG. 2 for preventing virus infection of the corporate LAN.

FIG. 3 is a flow diagram further illustrating the anti-virus protection procedure described above.

It will be appreciated by the person of skill in the art that various modifications may be made to the above described embodiments without departing from the scope of the present invention. For example, protocols other than HTTP may be used to communicate between the anti-virus application provider and the anti-virus application. For example, a custom protocol using TCP/IP may be designed and used.

In another modification to the invention, following discovery of a new virus by the provider of the anti-virus application, the provider sends a notification to subscribing e-mail gateways containing a checksum for the file containing the virus (or a relevant part of that file). A checksum can be calculated extremely quickly for a new virus, as compared to the time taken to generate a virus signature, and so the notification can be sent to e-mail gateways within a few minutes or a few hours of the detection of the virus. Upon receipt of the notification, a gateway begins calculating a checksum for newly received e-mails and/or attachments, and compares the calculated checksums against the checksum contained in the notification. If a calculated checksum matches the notified checksum, the associated email or its attachment is quarantined or discarded. Whilst this approach does not guard against polymorphic viruses which change upon replication, it will guard against the majority of viruses. The use of a checksum to detect a virus is a relatively time consuming operation (on the part of the e-mail gateway), so as soon as a virus signature has been determined for the virus by the provider, this is sent to the e-mail gateways for incorporation into respective signature databases and the use of the checksum is terminated.

The invention claimed is:

1. A method of preventing the infection of a computer network by a computer virus, where that virus can be spread by e-mail traffic, the method comprising:
   installing at an e-mail gateway of the network an anti-virus application, which application scans at least incoming e-mail traffic for known viruses;
   in the event that a new virus is detected by the provider of the anti-virus application, sending a notification of this event from the provider to the anti-virus-application;
   at the anti-virus application, responding to said notification by discontinuing normal handling of e-mails, wherein discontinuing normal handling of e-mails includes failing to deliver incoming e-mails or their attachments to their recipients within the network and causing these e-mails or attachments to be re-directed to a buffer for safe storage;
   subseguently generating a signature for the virus at the anti-virus application provider and providing that signature to the application at the gateway
   at the gateway, after receiving the signature, using the application to scan the previously buffered e-mails or attachments for the virus;
   after scanning the previously buffered e-mails, delivering e-mails or attachments which are virus free to their recipients, and
   causing the normal handling of e-mails at the e-mail gateway to be resumed.

2. A method according to claim 1 and comprising establishing a communication channel between the anti-virus application provider and the anti-virus application using a TCP/IP or UDP/IP protocol, and sending said notification over said channel.

3. A method according to claim 1, wherein said notification is sent from the application provider to the application as an e-mail.

4. A method according to claim 1, wherein said notification is sent from the application provider to the application as a result of a result of a request or enquiry sent from the application to the provider.

5. A system, the system comprising:
   a processor housed on a network server;
   an e-mail gateway installed on the network server;
   a repository accessible by the processor; and
   an anti-virus application installed on the network server, the application being arranged to interact with the e-mail gateway to scan incoming e-mails and/or e-mail attachments for known viruses, the application having means for receiving a notification from the provider of the application which notification causes the application to prevent delivery of e-mails or e-mail attachments received at the gateway and to divert these e-mails or attachments to a buffer for safe storage, and means for subsequently receiving a second notification from the provider which notification causes the application to cease preventing delivery of newly received e-mails or attachments.

6. A computer software storage medium having stored thereon an anti-virus application for causing a computer operating as an e-mail gateway to scan incoming e-mails and/or e-mail attachments for known viruses,
   the application being arranged to receive a notification from the provider of the application which notification causes the application to prevent delivery of e-mails or e-mail attachments received at the gateway and to divert these e-mails or attachments to a buffer for safe storage, and to subsequently receive a second notification from the provider which notification causes the application to cease preventing delivery of newly received e-mails or attachments.

7. A method of preventing the infection of a computer network by a computer virus, where that virus can be spread by e-mail traffic, the method comprising:
   installing at an e-mail gateway of the network an anti-virus application, which application scans at least incoming e-mail traffic for known viruses using a database of virus signatures;
   in the event that a new virus is detected by the provider of the anti-virus application, calculating a checksum for the file carrying the virus or a relevant part of that file, and sending a notification containing the checksum from the provider to the anti-virus-application; and
   at the anti-virus application, using the checksum to screen e-mails and/or their attachments for the virus until such time as a signature for the virus is received by the e-mail gateway from the application provider.

* * * * *